Sept. 3, 1935. E. O. BARSTOW ET AL 2,013,334
METHOD OF PRODUCING MAGNESIUM CHLORIDE FROM CALCIUM CHLORIDE
Filed Oct. 17, 1934
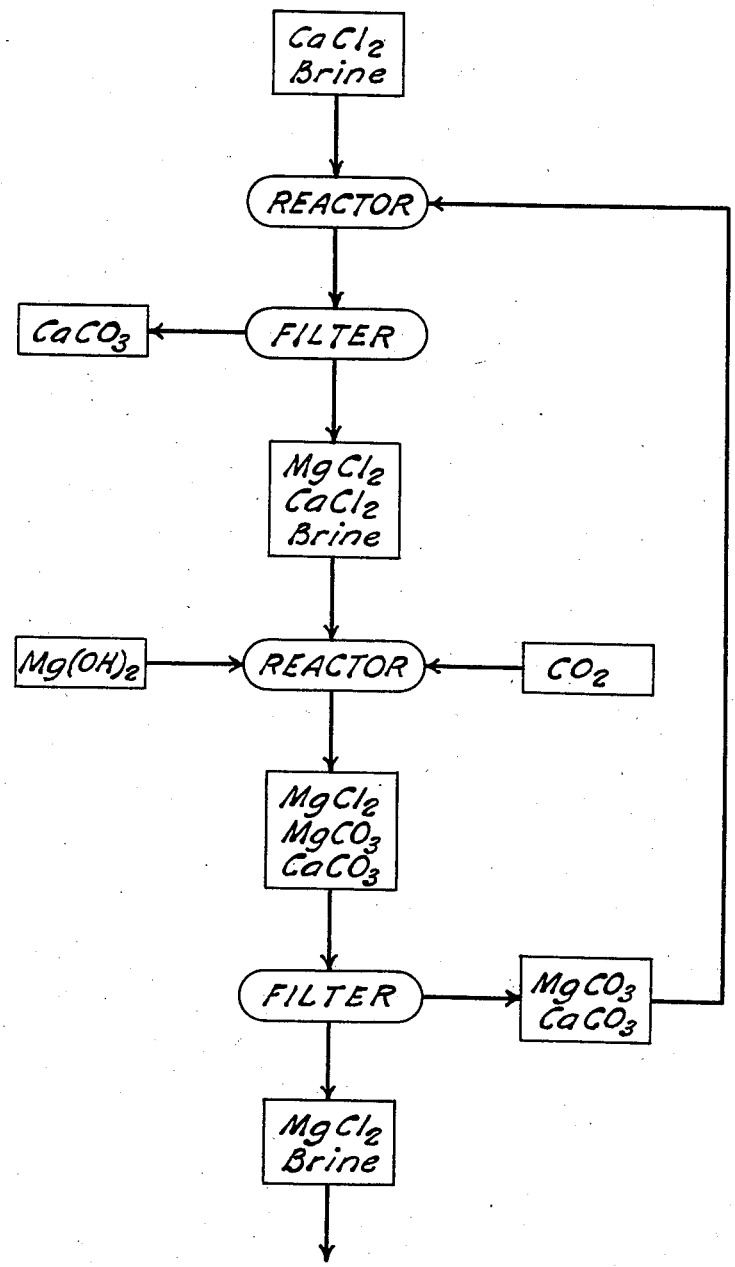
INVENTORS
Edwin O. Barstow
Sheldon B. Heath
BY Forest R. Minger
Thomas Griswold Jr. & E. C. Burdick
ATTORNEYS Patented Sept. 3, 1935

2,013,334

UNITED STATES PATENT OFFICE 2,013,334

METHOD OF PRODUCING MAGNESIUM CHLORIDE FROM CALCIUM CHLORIDE

Edwin O. Barstow, Sheldon B. Heath, and Forest R. Minger, Midland, Mich., assignors to The Dow Chemical Company, Midland, Mich., a corporation of Michigan Application October 17, 1934, Serial No. 748,674

6 Claims. (Cl. 23—91)

The invention relates to a method of producing a magnesium chloride solution from a calcium chloride solution, by treating the latter with magnesium carbonate or magnesium hydroxide and carbon dioxide. The method is an extension of the process described in our co-pending application Serial No. 649,684, filed December 31, 1932, Patent #1,978,403 issued Oct. 30, 1934, in which we have described and claimed a method of separating calcium chloride from magnesium chloride in a solution containing both salts.

A well known process of the present character involves the reaction between magnesium carbonate and calcium chloride, illustrated in the following equation:—

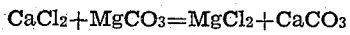

$$CaCl_2 + MgCO_3 = MgCl_2 + CaCO_3$$

The conversion of calcium chloride into magnesium chloride by means of the foregoing reaction in aqueous solution, we have found, does not occur completely unless there be employed a very considerable excess of magnesium carbonate over the amount chemically equivalent to the calcium chloride. The necessity to employ an excess of magnesium carbonate not only results in a waste of the same, but also creates the problem of economically separating the unused magnesium carbonate from the calcium carbonate formed in the reaction to obtain substantially pure calcium carbonate as a by-product.

We have now found that by treating calcium chloride solution with magnesium carbonate or magnesium hydroxide and carbon dioxide, as hereinafter described, the calcium chloride therein may be economically and substantially wholly converted into magnesium chloride when employing but slightly more carbonate or hydroxide of magnesium than that equivalent to the calcium chloride in the original solution, and calcium carbonate may be obtained as a by-product substantially free from magnesium carbonate. It is accordingly an object of the invention to provide a method of converting calcium chloride in aqueous solution into magnesium chloride solution, producing calcium carbonate as a by-product.

Briefly stated, the essential steps in the method consist, first, in treating calcium chloride solution or brine with precipitated magnesium carbonate in amount less than that equivalent to the calcium chloride in the solution whereby a part of the calcium chloride is converted into magnesium chloride and substantially all the magnesium carbonate is thereby converted into calcium carbonate. The calcium carbonate so precipitated is separated from the resulting solution which contains magnesium chloride together with the unreacted calcium chloride. The solution is then treated with magnesium carbonate in amount in excess of that equivalent to the calcium chloride remaining therein, whereby the latter is substantially wholly converted into magnesium chloride, and calcium carbonate is precipitated. The precipitated carbonate along with the remainder or excess of the magnesium carbonate is separated from the resulting magnesium chloride solution and returned to the first step, whereby the cycle is completed.

We have found that a substantially complete conversion of calcium chloride in the original solution into magnesium chloride is thereby obtained with a consumption of magnesium carbonate between about 102 and 110 per cent of that equivalent to the calcium chloride. The invention, then, consists in the combination of steps hereinafter fully described and particularly pointed out in the claims, the annexed drawing and the following description setting forth in detail various modes of carrying the invention into effect.

In said annexed drawing, the single figure illustrates diagrammatically a mode of carrying out the method in which magnesium hydroxide suspended in the brine is treated with carbon dioxide to produce therein the magnesium carbonate needed in the process.

Referring to the drawing, calcium chloride brine containing up to 10 per cent or more of calcium chloride is treated with precipitated magnesium carbonate, the amount of brine employed being such as to provide an excess of calcium chloride over that equivalent to the magnesium carbonate. It is preferable to carry out such treatment by mixing the brine and the precipitate for from 3 to 30 minutes or more. The calcium carbonate precipitate so formed is then separated from the brine. However, if desired, the treatment may be carried out by passing the brine through a filter or the like, the surface of which is coated with the precipitated magnesium carbonate produced in a subsequent step. The filtered brine thus obtained contains the unreacted calcium chloride and the magnesium chloride produced in the reaction.

We then convert the residual calcium chloride in the so obtained brine into calcium carbonate by treatment with magnesium carbonate produced by carbonating magnesium hydroxide suspended in the brine in amount in excess of that chemically equivalent to the calcium chloride in the mixed brine. This is accomplished by passing carbon dioxide into the suspension at ordinary temperatures in a suitable reactor. Such procedure converts substantially all the remaining calcium chloride into calcium carbonate and forms magnesium chloride, while the excess of magnesium hydroxide is converted into magnesium carbonate. Instead of treating the mixed brine with magnesium hydroxide and carbon dioxide as described, precipitated magnesium carbonate may be employed by mixing the same with the brine. A material excess of magnesium hydroxide or magnesium carbonate is required in this step, that is, from 5 to 80 per cent or more over the amount chemically equivalent to the calcium chloride in the brine to obtain a complete precipitation of the calcium as calcium carbonate. The amount of carbon dioxide absorbed varies with the concentration of magnesium hydroxide, the amount of diluents, if any, in the carbon dioxide gas, and other factors. We have found that a satisfactory absorption may be had with dilute carbon dioxide gas, i. e., 2 per cent $CO_2$ or more, such as the gases resulting from the combustion of coal or oil, when the depth of the suspension through which the gas is passed is more than 40 inches and the bubbles of gas sufficiently distributed. The term "carbon dioxide" used hereinafter and in the appended claims means either dilute or concentrated carbon dioxide gas. Ordinarily the loss of carbon dioxide can be more than compensated for by using the carbon dioxide formed by calcining the calcium carbonate produced in the first step together with the gases resulting from the combustion of the fuel used in the calcination.

Following the treatment with magnesium carbonate, or with magnesium hydroxide and carbon dioxide, the reactions of which may go to completion, as far as precipitating out substantially all calcium salt is concerned, within 20 hours under the conditions specified, the precipitate containing calcium carbonate and the excess of magnesium carbonate is separated from the brine and transferred to the first step, whereby the cycle is completed. For this purpose it is convenient to collect the precipitate upon a Moore filter and use it in the first step as aforementioned.

Calcined dolomitic lime or magnesite may be used as a source of magnesium hydroxide which may be produced from such materials in suitable ways, and the magnesium hydroxide may be converted into magnesium carbonate as described, or precipitated magnesium carbonate may be used directly in the two stages as aforementioned. The process may be carried out with calcium chloride solution containing neutral alkali metal salts and small amounts of the compounds of iron, manganese, and like materials which form insoluble oxides and carbonates.

Our new method has the advantage that calcium chloride may be converted into magnesium chloride in aqueous solution without employing more magnesium hydroxide or carbonate than 2 to 10 per cent in excess of that equivalent to the calcium chloride in the original solution, and the separation from the solution of the precipitates formed in the reactions, especially the magnesium carbonate, is readily accomplished by filtering or settling. Precipitated calcium carbonate substantially free from magnesium carbonate may be obtained as a by-product.

Other modes of applying the principle of our invention may be employed instead of those explained, change being made as regards the method herein disclosed, provided the steps stated by any of the following claims or the equivalent of such stated steps be employed.

We therefore particularly point out and distinctly claim as our invention:—

1. The method of converting calcium chloride solution into magnesium chloride solution which comprises treating a calcium chloride solution substantially free from magnesium chloride with precipitated magnesium carbonate in amount less than that equivalent to the calcium chloride in the solution, separating the precipitated calcium carbonate from the resulting solution, suspending magnesium hydroxide in the solution in amount in excess of that equivalent to the calcium chloride remaining therein, treating the suspension with carbon dioxide, and then separating the precipitated carbonates from the resulting magnesium chloride solution.

2. The method of converting calcium chloride solution into magnesium chloride solution which comprises treating calcium chloride brine substantially free from magnesium chloride with precipitated magnesium carbonate in amount less than that equivalent to the calcium chloride in the solution, separating the precipitated calcium carbonate from the resulting solution, suspending magnesium hydroxide in the solution in amount in excess of that equivalent to the calcium chloride remaining therein, treating the suspension with carbon dioxide, separating the precipitated carbonates from the resulting magnesium chloride solution, and returning the precipitate to the first step.

3. The method of converting calcium chloride solution into magnesium chloride solution which comprises passing calcium chloride solution through a filter the surface of which is coated with the carbonates of calcium and magnesium, the amount of magnesium carbonate being less than that equivalent to the calcium chloride in the solution passed therethrough, suspending magnesium hydroxide in the resulting filtered solution in amount in excess of the calcium chloride therein, passing carbon dioxide gas into the solution, filtering the precipitated carbonates from the resulting magnesium chloride solution whereby a coating of the carbonates of calcium and magnesium is produced upon the filter.

4. The method of converting calcium chloride solution into magnesium chloride solution which comprises passing calcium chloride solution through a filter the surface of which is coated with the carbonates of calcium and magnesium, the amount of magnesium carbonate being less than that equivalent to the calcium chloride in the solution passed therethrough, suspending magnesium hydroxide in the resulting filtered solution in amount in excess of the calcium chloride therein, passing carbon dioxide gas into the solution, filtering the precipitated carbonates from the resulting magnesium chloride solution whereby a coating of the carbonates of calcium and magnesium is produced upon the filter, and employing the so coated filter in the first step.

5. The method of converting calcium chloride into magnesium chloride in aqueous solution which comprises treating a solution containing calcium chloride with precipitated magnesium carbonate in amount less than that equivalent to the calcium chloride therein, separating the precipitated calcium carbonate from the solution, treating the solution with precipitated magnesium carbonate in amount in excess of that equivalent to the calcium chloride therein, and separating the precipitated carbonates from the resulting magnesium chloride solution.

6. The method of converting calcium chloride into magnesium chloride in aqueous solution which comprises treating a solution containing calcium chloride with precipitated magnesium carbonate in amount less than that equivalent to the calcium chloride therein, separating the precipitated calcium carbonate from the solution, treating the solution with precipitated magnesium carbonate in amount in excess of that equivalent to the calcium chloride therein, separating the precipitated carbonates from the resulting magnesium chloride solution, and returning the precipitated carbonates to the first step.

EDWIN O. BARSTOW.
SHELDON B. HEATH.
FOREST R. MINGER.